United States Patent
Perherin (10) Patent No.: US 12,066,136 B2
(45) Date of Patent: Aug. 20, 2024

(54) FLUID CIRCUIT COMPRISING A CONNECTING FITTING FOR PIPES, COMPRISING A GUIDE MEMBER FOR A HEATER DUCT

(71) Applicant: AIRBUS ATLANTIC, Rochefort (FR)

(72) Inventor: Daniel Perherin, Saint-Nazaire (FR)

(73) Assignee: Airbus Atlantic, Rochefort (FR)

( * ) Notice: Subject to any disclaimer, the term of this patent is extended or adjusted under 35 U.S.C. 154(b) by 333 days.

(21) Appl. No.: 17/777,262

(22) PCT Filed: Nov. 24, 2020

(86) PCT No.: PCT/EP2020/083201
§ 371 (c)(1),
(2) Date: May 16, 2022

(87) PCT Pub. No.: WO2021/110477
PCT Pub. Date: Jun. 10, 2021

(65) Prior Publication Data
US 2022/0397222 A1 Dec. 15, 2022

(30) Foreign Application Priority Data
Dec. 6, 2019 (FR) ...................................... 1913858

(51) Int. Cl.
*F16L 53/32* (2018.01)
*F16L 17/02* (2006.01)
*F16L 37/12* (2006.01)

(52) U.S. Cl.
CPC ............... *F16L 53/32* (2018.01); *F16L 17/02* (2013.01); *F16L 37/1225* (2013.01)

(58) Field of Classification Search
CPC ......... F16L 25/12; F16L 37/12; F16L 37/138; F16L 37/1225; F16L 53/32
(Continued)

(56) References Cited

U.S. PATENT DOCUMENTS 3,495,853 A * 2/1970 Furrer .................... F16L 37/148
285/305
3,784,785 A * 1/1974 Noland .................... F24H 1/142
285/46
(Continued)

FOREIGN PATENT DOCUMENTS

DE        299 11 104 U1    9/1999
WO     WO 2018/114342 A1   6/2018

OTHER PUBLICATIONS

Search Report from the French Intellectual Property Office on corresponding FR application (FR1913858) dated May 4, 2020.
(Continued)

*Primary Examiner* — Patrick F Brinson
(74) *Attorney, Agent, or Firm* — ALUMEN IP Law PC (57) ABSTRACT

A fluid circuit, in particular for an aircraft, having at least a first pipe, a second pipe and a connecting fitting, each pipe having a connection end and extending along an axis X, the connecting fitting, movably mounted between the two pipes, being configured to mechanically connect the two connection ends, the connecting fitting having a connecting sleeve and a guide member formed on an outer surface of the connecting sleeve and configured to cooperate with a heater duct so as to guide it between the two pipes, the heater duct being configured to transmit heat to the pipes and to the connecting fitting so as to prevent them from icing up.

10 Claims, 7 Drawing Sheets

(58) Field of Classification Search
USPC ............ 138/32, 33, 109, 112, 113; 219/535; 285/325, 305, 108
See application file for complete search history.

(56) References Cited

U.S. PATENT DOCUMENTS

| | | |
|---|---|---|
| 4,031,611 A | 6/1977 | Johnson, Jr. |
| 2003/0079787 A1* | 5/2003 | Heise ..................... F16L 53/38 219/535 |
| 2005/0139278 A1 | 6/2005 | Thompson |
| 2019/0316717 A1* | 10/2019 | Sireude ............... F16L 37/1225 |

OTHER PUBLICATIONS

International Search Report and Written Opinion on corresponding PCT application (PCT/EP2020/083201) from International Searching Authority (EPO) dated Feb. 16, 2021.

* cited by examiner

FLUID CIRCUIT COMPRISING A CONNECTING FITTING FOR PIPES, COMPRISING A GUIDE MEMBER FOR A HEATER DUCT

TECHNICAL FIELD

The present invention relates to the field of fluid circuits in an aircraft, for example, a drinking water circuit, a waste water circuit, a drainage circuit, etc.

In a known manner, a fluid circuit comprises a plurality of pipes mechanically and fluidly interconnected to each other. When a fluid circuit is placed in an aircraft, the pipes are independently secured to the aircraft structure and then fluidly connected to each other. In other words, the pipes are not movable relative to each other, but fixed when connected.

Figure 1A:
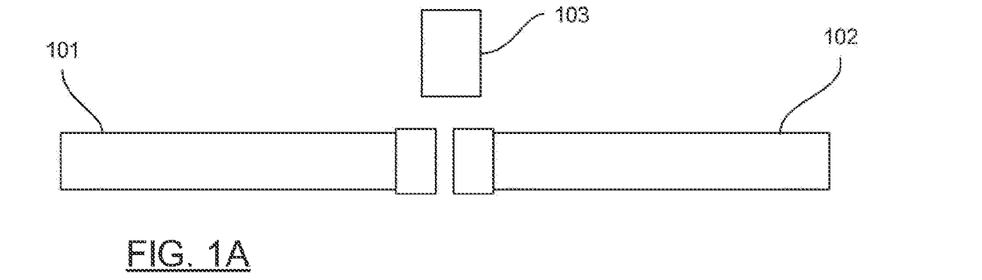
FIG. 1A, FIG. 1B and FIG. 1C are schematic representations of a fluid circuit according to prior art and of a heater duct fastened to such fluid circuit by means of a guide member of prior art.

As represented in FIG. 1A, to connect a first pipe 101 to a second pipe 102, it is known to use an interconnecting fitting 103 that has to be mounted at the interface between the first pipe 101 and the second pipe 102 in order to ensure a sealed connection. Such an interconnecting fitting may, for example, be a metal collar known in prior art.

Furthermore, during a flight, the pipes are subjected to temperatures lower than 0° C., a temperature below which water freezes. Therefore, it is known to associate to the fluid circuit a heater duct allowing the temperature of the water in the pipes to be maintained above 0° C., so as to limit any risk of damage to the fluid circuit. Such a heater duct further allows the water which could have stagnated in the pipes to be thawed, for example when an aircraft remains on the ground for a significant period of time and the outside temperatures are low.

Figure 1B:
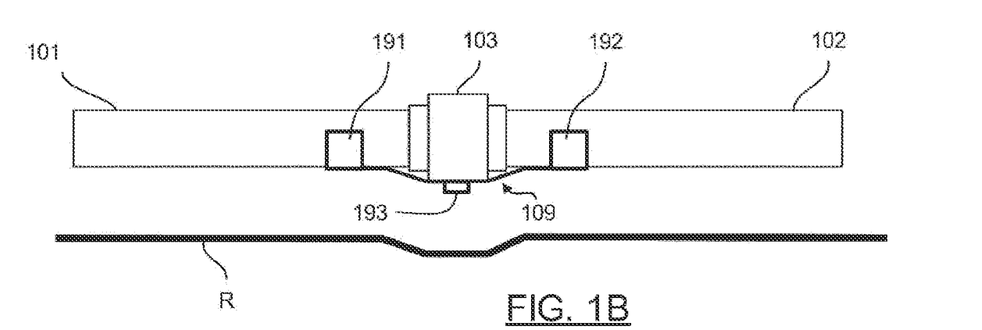
Figure 1C:
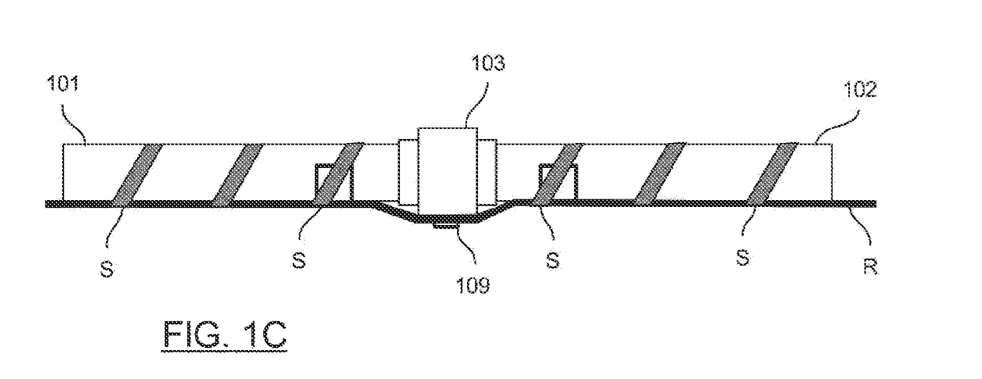

Such a heater duct R is represented in FIGS. 1B and 1C and is in a known manner put in contact with the pipes 101, 102 so as to allow a heat transfer from the heater duct R to the pipes 101, 102. In practice, the heater duct R is fastened along the pipes 101, 102 by means of a spirally positioned strip of adhesive tape S, as represented in FIG. 1C.

In practice, the interconnecting fitting 103, positioned between the two pipes 101, 102, has a diameter greater than the diameter of the pipes 101, 102, as illustrated in FIG. 1B. In other words, the interconnecting fitting 103 extends radially protruding from the pipes 101, 102, which presents a drawback when fastening the heater duct R.

In order to also allow for the heating of the interconnecting fitting 103, it is known to use a guide member 109, mounted as an add-on, which allows both the positioning of the heater duct R along the pipes 101, 102 and the bypassing of the protrusion formed by the interconnecting fitting 103.

A guide member 109 known in the state of the art, represented in FIGS. 1B and 1C, comprises a longitudinal body and comprises at its ends two mounting forks 191, 192 for respectively cooperating with the two pipes 101, 102. The mounting forks 191, 192 are substantially U-shaped, so as to cooperate with the pipes 101, 102, and comprise an upwardly facing open cavity to accommodate the pipes 101, 102. The longitudinal body comprises a central fork 193 comprising a downwardly facing cavity to receive the heater duct R. The longitudinal body is V-shaped so as to guide the heater duct R along the interconnecting fitting 103. The longitudinal body is metallic so as to conduct heat from the heater duct R at its mounting forks 191, 192 which is then transmitted to the pipes 101, 102.

However, such a guide member 109 has several drawbacks. Indeed, an operator has to position such a guide member 109 added on at each interconnecting fitting 103. Such an operation is performed manually by an operator, which is tedious, time-consuming, and generates inaccurate mounting. Furthermore, as represented in FIG. 1C, such an added-on guide member 109 bypasses the interconnecting fitting 103, which results in the heater duct R being moved away from the interconnecting fitting 103. The interconnecting fitting 103, which is not in contact with the heater duct R due to the guide member 109, is thus not optimally heated, which may lead to icing of the interconnecting fitting 103 in case of low temperatures.

Systems for fastening a heating element to a tube are known from documents U.S. Pat. No. 4,031,611A1 and DE29911104U1. Also known from document WO2018114342A1, an interconnecting fitting mounted between two pipes. Incidentally, a drainage system interconnected to a drain of a sink or drain pan is known from document US2005139278.

The purpose of the invention is to eliminate at least some of these drawbacks by providing an interconnecting fitting and placing method that are simple, limit cost and installation time while improving heating.

SUMMARY

The invention relates to a fluid circuit, in particular for an aircraft, comprising at least a first pipe, a second pipe and an interconnecting fitting, each pipe comprising a connection end and extending along an axis X, the interconnecting fitting, movably mounted between the two pipes, being configured to mechanically interconnect the two connection ends.

The interconnecting fitting is remarkable in that it comprises an interconnecting sleeve and a guide member formed on an outer surface of the interconnecting sleeve, the guide member, defining a hollow housing, being configured to cooperate with a heater duct, so as to guide it between the two pipes, the heater duct being configured to transmit heat to the pipes and the interconnecting fitting in order to avoid icing thereof.

The interconnecting fitting according to the invention has the advantage of allowing, by means of a single part, both two pipes to be connected and the heater duct to be guided in a fluid circuit. The integration of the guide member (not added on) directly on the interconnecting fitting advantageously allows the number of parts needed for the fitting to be limited and the installation of the heater duct to be facilitated without requiring any particular tooling. Also, an operator can mount and fasten the interconnecting fitting to a fluid circuit in a faster way. Advantageously, the installation time and costs of the interconnecting fitting according to the invention are greatly reduced. Moreover, the guide member allows direct contact of the heater duct with the interconnecting fitting, advantageously allowing improved heat transfer with the interconnecting fitting, which is thus less susceptible to icing.

Preferably, the interconnecting fitting is movably mounted on the first pipe, so as to allow even faster assembly in an aircraft by simply sliding the interconnecting fitting along the first pipe until it covers both connection ends. Such a mounting also allows for limiting overstressing in the pipes previously fastened to the aircraft structure.

Preferably, the guide member of the interconnecting fitting is made of the material of the interconnecting sleeve, making it possible to limit the interconnection forces at the junction between the guide lugs and the interconnecting sleeve. The manufacture of a single-piece part further limits the stresses that could occur in the part at the interfaces. In addition, such a configuration allows the manufacture of a single part, which is easier to store.

In addition, a guide member of the same material ensures continuity of the material whose coefficient of thermal expansion is unchanged. Also, such a configuration advantageously avoids heat transfer difficulties between a separate guide member and an interconnecting fitting, also limiting expansion differences in bolted interconnections, for example. Heat transfers with the interconnecting sleeve are improved.

According to one embodiment, the interconnecting fitting comprises a sealing member, for extending between the connection ends of the pipes, the sealing member being positioned internally of said interconnecting sleeve.

Preferably, said sealing member comprises a positioning element extending protruding from the interconnecting sleeve into the hollow housing of the guide member so as to be in direct contact with the heater duct. Such a positioning element so positioned in the hollow housing in direct contact with the heater duct allows heat conduction into the sealing member within the interconnecting fitting. Since the sealing member is in direct contact with the fluid to be conducted, heat transfers from the heater duct to the fluid are improved.

Preferably, the interconnecting sleeve comprises a positioning aperture, the positioning element of the sealing member extends radially into the hollow housing through the positioning aperture. The positioning element thereby locks the interconnecting sleeve to the sealing member allowing unintentional movement of one relative to the other to be limited.

Preferably, the positioning element is made of the material of the sealing member to limit stresses due to added-on parts.

A positioning element made of the material of the sealing member also ensures the transfer of heat into the connection ends, advantageously making it possible to limit the risks of sudden changes in temperature that could lead to icing of the water on the walls of the pipes at the connection ends. By virtue of the positioning element in contact with the heater duct in the guide member, heat transfers are advantageously improved.

Preferably, the sealing member is made of an elastomer material having the advantage of sealing the connection between the two pipes due to the properties of elastomer.

In one embodiment of the invention, the guide member of the interconnecting fitting comprises at least a first guide lug and a second guide lug, advantageously enabling effective guiding of the heater duct.

Preferably, at least the first guide lug is configured to extend laterally with respect to the heater duct, so as to advantageously perform the function of guiding the heater duct with respect to the pipes. Lateral positioning makes it possible to limit the movements of the heater duct relative to the pipes, for example, in the event of vibrations of the fluid circuit.

Preferably, the second guide lug is mounted facing the first guide lug, so as to form the hollow housing between the first guide lug and the second guide lug. The heater duct is thus advantageously held in place laterally in all directions. Preferably, the second guide lug is configured to also extend laterally with respect to the heater duct. By facing, it is meant that the guide lugs may be positioned at the same axial position or axially offset.

In one embodiment of the invention, at least the first guide lug is L-shaped, so as to both guide and support the heater duct. Advantageously, an L-shape allows the heater duct to be held in place at the interconnecting fitting. The L-shape allows for local support of the heater duct, making it easier to install a heater duct in a fluid circuit. This greatly reduces installation time and costs. Such an L-shape further allows the heater duct to be pressed against the interconnecting fitting, allowing for improved heat transfer.

Preferably, the first guide lug and the second guide lug are L-shaped. The hollow housing formed by the L-shaped guide lugs further allows the heater duct to slide in the axis of the pipes, advantageously limiting overstressing related, for example, to fastenings of the heater duct to the interconnecting fitting.

Preferably, the first guide lug and the second guide lug are configured to elastically move apart from each other, so as to allow the insertion of the heater duct. Such a configuration allows a simple and fast mounting by simply pushing the heater duct against the walls of the guide lugs, causing the guide lugs to move apart from each other. Also, simply pushing the heater duct allows the heater duct to be positioned and held in place by clipping into the hollow housing.

Preferably, the guide member is made of a thermoplastic material, allowing flexibility of the guide lugs, allowing them to be relatively moved apart from each other without requiring specific tooling.

According to one embodiment, the interconnecting fitting comprises a locking member fastened to the second pipe and configured to cooperate with the interconnecting sleeve, so as to allow the interconnecting sleeve and the sealing member to be fastened between the two connection ends, making it possible to ensure a sealed interconnection between the first pipe and the second pipe.

The invention also relates to an assembly of a fluid circuit as previously described and a heater duct, mounted in said hollow housing of the guide member of the interconnecting fitting.

The invention also relates to an aircraft comprising at least one assembly of a fluid circuit and a heater duct as previously described.

Finally, the invention is concerned with a method of placing a heater duct in a fluid circuit as previously described, said method comprising:
  a step of fastening the interconnecting fitting between the connection ends of the pipes, and
  a step of inserting the heater duct into the hollow housing of the guide member, so as to allow intimate cooperation between the interconnecting fitting and the heater duct.

BRIEF DESCRIPTION OF THE DRAWINGS

The invention will be better understood upon reading the following description, which is given solely by way of example, and referring to the appended drawings given as non-limiting examples, in which identical references are given to similar objects and in which.

It should be noted that the figures set out the invention in detail to implement the invention, said figures can of course be used to better define the invention if necessary.

DETAILED DESCRIPTION

A fluid circuit according to the invention will be set forth for being mounted in an aircraft, in particular for the transport of water, although it goes without saying that the fluid circuit could just as well allow the transport of a different fluid, such as fuel or gases.

In particular, the fluid circuit according to the invention described herein generally operates under vacuum, that is, the pressure inside the fluid circuit is lower than atmospheric pressure, allowing a fluid to circulate in the fluid circuit.

In this example, the fluid circuit comprises a plurality of pipes that are connected with each other in order to guide a fluid. In an aeronautical application, the individual pipes are firstly secured to an aircraft structure and then secondly connected to each other by moving interconnecting fittings.

In the following, the invention will be set forth for the connection of two pipes of a fluid circuit. Nevertheless, the invention is also applicable to the connection of more than two pipes.

Figure 2A:
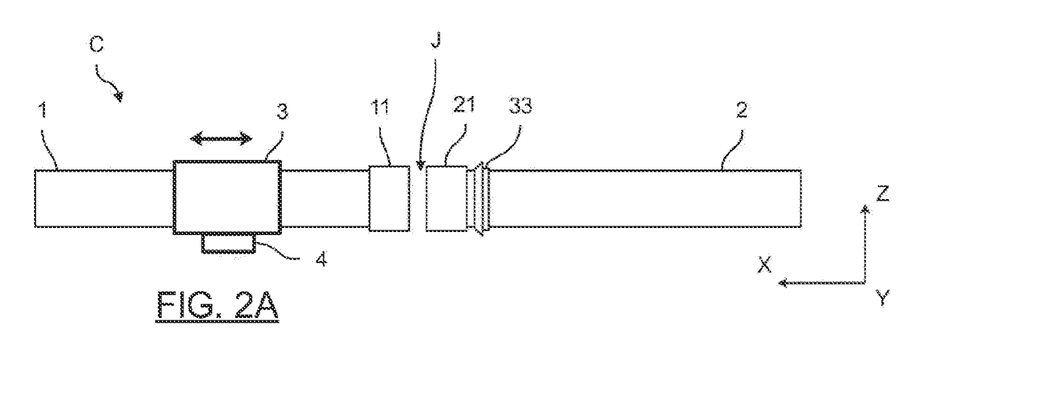
FIG. 2A and FIG. 2B are schematic representations of a fluid circuit connected by means of an interconnecting fitting according to the invention.
Figure 2B:
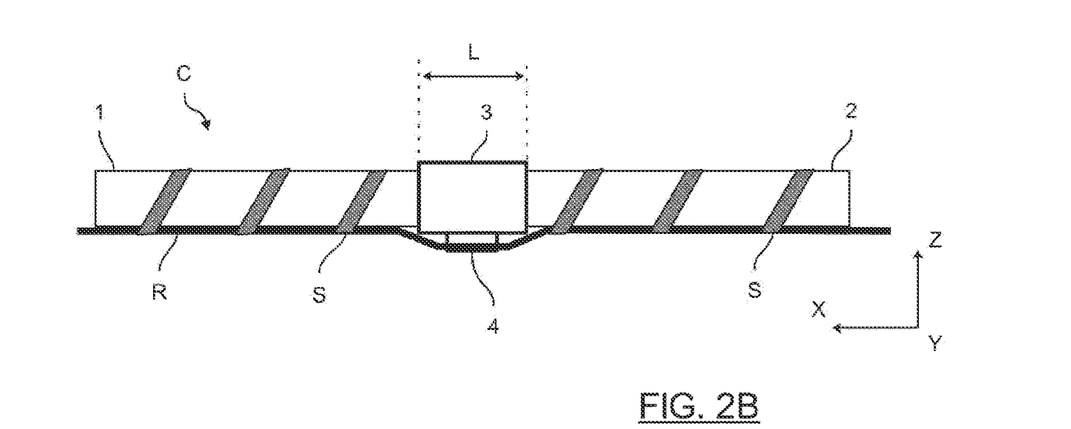

With reference to FIGS. 2A and 2B, a fluid circuit C according to an embodiment of the invention is represented. The fluid circuit C comprises a first pipe 1, a second pipe 2, mounted facing each other, and an interconnecting fitting 3, for being mounted at the interface between the first pipe 1 and the second pipe 2, in order to fluidly connect them.

Figure 5:
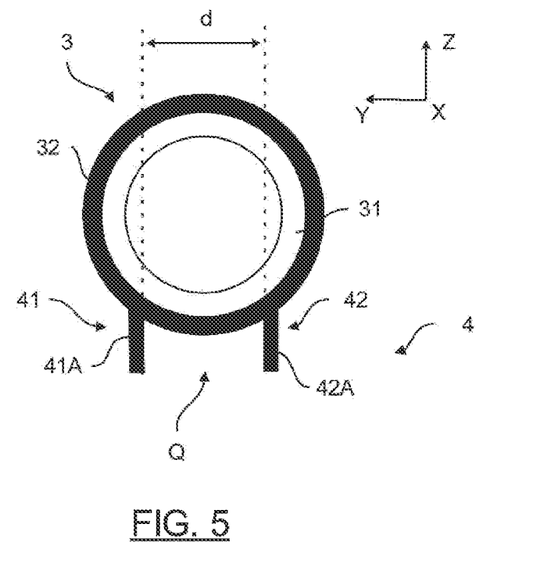
FIG. 5 is a transverse cross-section view of the interconnecting fitting of FIG. 3.

In this example, the fluid circuit C extends longitudinally along an axis X, transversely along an axis Y, and vertically along an axis Z, so as to form an orthogonal reference frame (X, Y, Z). Also, the term vertical describes an object extending in the plane (Y, Z) and the term horizontal, an object extending in the plane (X, Y). In addition, the terms "downward" and "upward" refer to the axis Z which extends vertically from the bottom to the top. Incidentally, the terms "left" and "right" refer to the axis Y that extends horizontally from right to left, in a front view, that is, a view positioned in the longitudinal axis of the pipes 1, 2 (as represented in FIG. 5).

In this embodiment, each pipe 1, 2 comprises a tubular body that is terminated at each end by a connection spigot. Thus, each connection spigot forms a connection end 11, 21 of the pipe 1, 2. Further, each pipe 1, 2 defines an inner surface, in contact with the fluid to be conducted, and an outer surface, opposite the inner surface.

Also, as represented in FIG. 2A, the first pipe 1 and the second pipe 2, spaced apart by a gap clearance J, respectively comprise a first connection end 11 and a second connection end 21, each of the two connection ends 11, 21 being intended to cooperate with the interconnecting fitting 3. In other words, the interconnecting fitting 3 is used to connect the two pipes 1, 2 that are moved apart.

With reference to FIG. 2B, the interconnecting fitting 3 is to be mounted between the first pipe 1 and the second pipe 2, so as to fluidly connect the two pipes 1, 2. Such a positioning will be referred to hereinafter as "mounted position". In other words, the interconnecting fitting 3 according to the invention is configured to mechanically interconnect the connection ends 11, 21 of the pipes 1, 2. Preferably, the interconnecting fitting 3 is pre-mounted on one of the pipes 1, 2 of the fluid circuit C and is movable thereon, as represented in FIG. 2A. In this example, the interconnecting fitting 3 is pre-mounted sliding along the first pipe 1.

Pre-mounting advantageously allows the interconnecting fitting 3 to be positioned when the pipes 1, 2 are fastened to an aircraft structure, which saves a lot of time. In addition, the connection between the first pipe 1 and the second pipe 2 is simplified, as will be set forth later. It goes without saying, however, that the interconnecting fitting 3 could be mounted later.

In this example, the interconnecting fitting 3 has a length L along the longitudinal axis X of between 50 and 65 mm, so as to completely cover the gap clearance J and the two connection ends 11, 21, while ensuring the fluid connection between the first pipe 1 and the second pipe 2, as illustrated in FIG. 2B.

Figure 3:
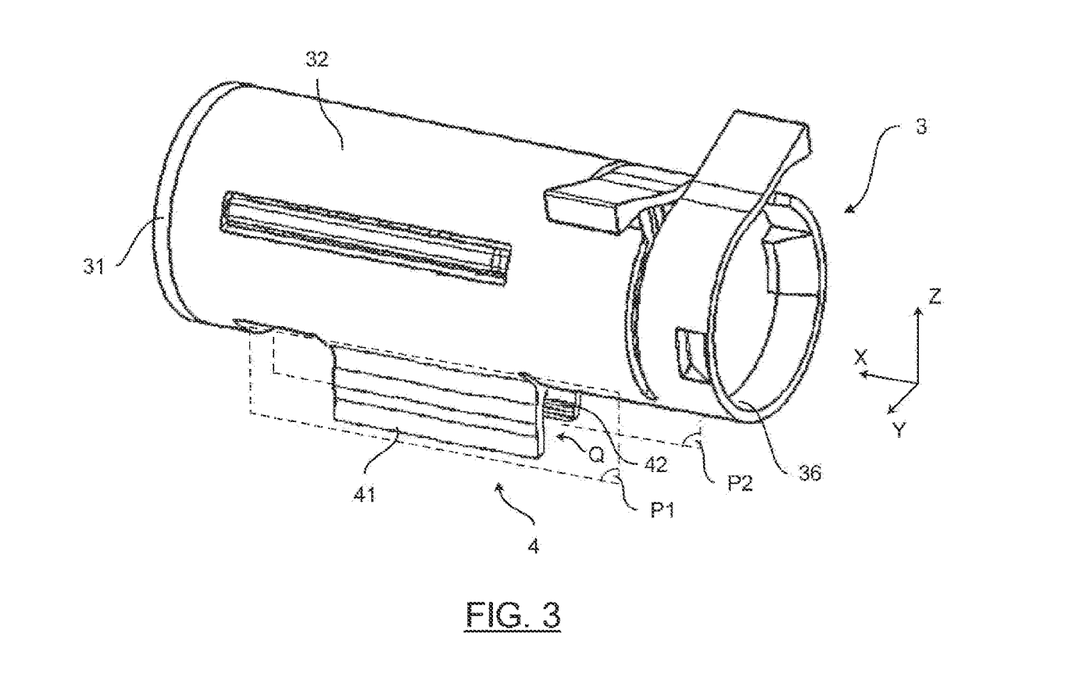
FIG. 3 is a schematic representation of an interconnecting fitting of FIGS. 2A and 2B comprising a guide member according to a first embodiment of the invention.
Figure 4:
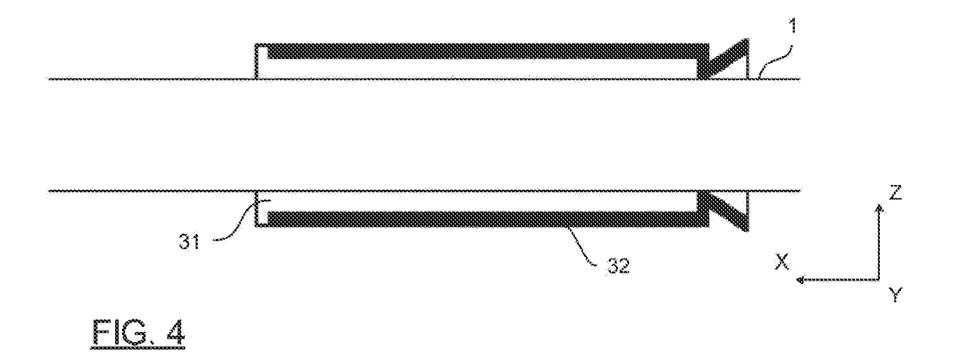
FIG. 4 is a longitudinal cross-section view of the interconnecting fitting of FIG. 3.

According to one embodiment of the invention, with reference to FIGS. 3 to 5, the interconnecting fitting 3 comprises a sealing member 31, for extending between the connection ends 11, 21, an interconnecting sleeve 32, for covering the sealing member 31, and a locking member 33 (represented in FIG. 2A), for locking the interconnecting sleeve 32 and the sealing member 31 in the mounted position between the connection ends 11, 21, so as to prohibit any unintentional movement.

With reference to FIGS. 3 and 4, the sealing member 31 extends longitudinally along the axis X. As such, the sealing member 31 has in this example the shape of a hollow cylinder so as to cooperate with the pipes 1, 2. The sealing member 31 comprises a radial outer surface and a radial inner surface, opposite the radial outer surface and for cooperating with the connection ends 11, 21. Preferably, the radial inner surface of the sealing member 31 has a diameter substantially equal to the diameter of the connection ends 11, 21, so as to ensure the sealing of the interconnecting fitting 3.

In this example, the sealing member 31 is made of an elastomer material, sealing the connection between the two pipes 1, 2. Indeed, the elastic properties of such a material allow the sealing member 31 to act as a seal by pressing the sealing member 31 against the radial outer surface of the pipes 1, 2.

As represented in FIG. 3, the interconnecting sleeve 32 has the shape of a hollow cylinder so as to cooperate with the sealing member 31. The interconnecting sleeve 32 comprises a radial outer surface and a radial inner surface, opposite the radial outer surface and for cooperating with the radial outer surface of the sealing member 31. Preferably, the radial inner surface of the interconnecting sleeve 32 has a diameter substantially equal to the diameter of the radial outer surface of the sealing member 31. In other words, the interconnecting sleeve 32 is positioned to form an enclosure for the sealing member 31.

According to one exemplary embodiment, the interconnecting sleeve 32 is made of a thermoplastic material, its mass and cost are then greatly reduced, which is advantageous.

In this example, the interconnecting sleeve 32 comprises a fastening device 36 configured to cooperate with the locking member 33, integral with the second pipe 2, so as to lock the interconnecting sleeve 32 and the sealing member 31 between the connection ends 11, 21.

This document sets forth the example of an interconnecting fitting 3 comprising an interconnecting sleeve 32 mounted on a sealing member 31, however it goes without saying that the interconnecting fitting 3 could just as well comprise an interconnecting sleeve 32, mounted directly on the pipes 1, 2 and configured to connect the connection ends 11, 12. In such a configuration, the radial inner surface of the interconnecting sleeve 32 would have a diameter substantially equal to the diameter of the connection ends 11, 12, so as to ensure the sealing of the interconnecting fitting 3

As illustrated in FIG. 2B, the interconnecting fitting 3 comprises a guide member 4 configured to guide a heater duct R between the two pipes 1, 2. The heater duct R is configured to transmit heat to the pipes 1, 2 and the interconnecting fitting 3 in order to avoid icing thereof. Also, the guide member 4 according to the invention also allows the heater duct R to be positioned in direct contact with the interconnecting fitting 3, so as to optimize heat exchange. In this example, the heater duct R has a substantially rectangular cross-section in the transverse plane (Y, Z), so as to allow the heating of a larger pipe surface. The heater duct R has a width, that is a dimension along the transverse axis Y in the mounted position, of between 7.8 and 11.8 mm, preferably 9.8 mm.

The heater duct R extends longitudinally along the axis X along the pipes 1, 2. In this example, for the sake of clarity, the heater duct R is configured to be positioned below the pipes 1, 2, as represented in FIG. 2B. However, it goes without saying that the heater duct R could just as easily be positioned above the pipes or in any position that allows the heater duct R to be joined along the pipes 1, 2.

With reference to FIGS. 3 and 4, the guide member 4 is formed on the radial outer surface of the interconnecting sleeve 32. In this example, the guide member 4 extends longitudinally along the axis X at a lower end of the interconnecting sleeve 32 when the interconnecting fitting 3 is in the mounted position, so as to be able to receive the heater duct R.

Preferably, the guide member 4 is made of the material of the interconnecting sleeve 32, which advantageously allows the interconnection stresses to be limited at the junction between the guide member 4 and the interconnecting sleeve 32. This further promotes thermal exchange. The integration of a non-added-on member also advantageously simplifies the installation of an interconnecting fitting 3 on the fluid circuit C. In addition, installation is faster and does not require prior fastening. Thus, the time and cost of installation of the interconnecting fitting 3 according to the invention is greatly reduced.

As represented in FIG. 3, in a first embodiment of the invention, the guide member 4 comprises two guide lugs 41, 42 extending longitudinally along the axis X. The two guide lugs 41, 42 extend substantially over half the length of the interconnecting fitting 3, so as to form a sufficient support surface for the heater duct R.

With reference to FIG. 5, the two guide lugs 41, 42 are configured to extend laterally preferably on either side of the heater duct R. In other words, in the mounted position, a first guide lug 41 extends to the left of the heater duct R and a second guide lug 42 extends to the right of the heater duct R.

To this end, each guide lug 41, 42 comprises a substantially horizontal side wall 41A, 42A, that is, extending in a plane P1, P2 parallel to the plane (X, Y), when the interconnecting fitting 3 is in the mounted position. In this example, the two guide lugs 41, 42 are positioned facing each other, so as to provide a hollow housing Q, for receiving the heater duct R. Each guide lug 41, 42 is, in this example, formed by a single side wall 41A, 42A.

Preferably, the side walls 41A, 42A are spaced apart along the transverse axis Y by a spacing distance d of between 8 and 12 mm, preferably 10 mm, so as to allow the passage of the heater duct R.

The guide member 4 advantageously allows the heater duct R to be guided when the latter is mounted on the fluid circuit C. The guide member 4 directly integrated into the interconnecting fitting 3 advantageously allows the heater duct R and the interconnecting fitting 3 to be brought into direct contact, so as to increase the heat transfers to the interconnecting fitting 3, thus improving the heating of the interconnecting fitting 3. The guide member 4 according to the invention further allows for a simple and quick installation of the heater duct R by dispensing with the use of an additional add-on element.

Figure 6:
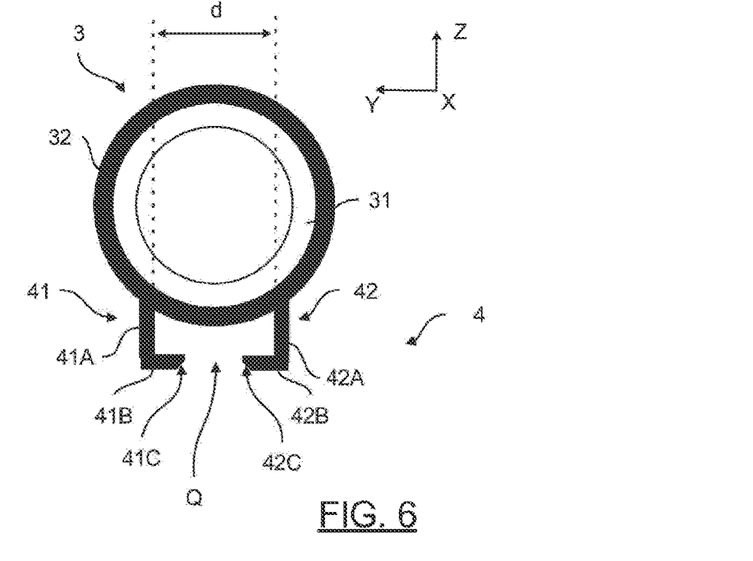
FIG. 6 is a transverse cross-section view of an interconnecting fitting comprising a guide member according to a second embodiment of the invention.

In a second embodiment, with reference to FIG. 6, the two guide lugs 41, 42 are L-shaped in the transverse plane (Y, Z). As such, each guide lug 41, 42 comprises a side wall 41A, 42A extending substantially in a plane P1, P2 parallel to the plane (X, Z) and a bottom wall 41B, 42B substantially horizontal, that is extending in a plane parallel to the plane (X, Y), when the interconnecting fitting 3 is in the mounted position. Each bottom wall 41B, 42B allows the heater duct R to be intimately pressed against the interconnecting sleeve 32.

In this example, the two guide lugs 41, 42 positioned facing each other provide a hollow housing Q between all of the side walls 41A, 42A and the bottom walls 41B, 42B. Each guide lug 41, 42 forming an L, each bottom wall 41B, 42B comprises a free end 41C, 42C. The two free ends 41C, 42C positioned facing each other form a passage aperture between the two bottom walls 41B, 42B allowing access to the hollow housing Q.

Preferably, each wall of the guide lugs 41, 42 is elastic, so as to maintain a flexibility that advantageously allows the guide lugs 41, 42 to be spaced apart from each other. In this example, each wall has a thickness of between 1 and 2 mm.

Indeed, the guide lugs 41, 42 are configured to move apart from each other from an initial position, so as to be placed in a position of passage of the heater duct R. To this end, with reference to FIG. 6, each bottom wall 41B, 42B preferably comprises at its free end 41C, 42C an oblique edge configured to allow the sliding of the heater duct R upon insertion thereof into the hollow housing Q, via the passage aperture. The oblique edges are convergent toward the interconnecting sleeve 32.

In practice, when the heater duct R is pushed radially against the oblique edges of the bottom walls 41B, 42B in the passage aperture, the guide lugs 41, 42 are configured to move apart from each other under tension along the transverse axis Y so as to enlarge the passage aperture and thereby allow insertion of the heater duct R into the hollow housing Q. The guide lugs 41, 42 are further configured to be returned to their initial position when the heater duct R is positioned in the hollow housing Q, due to their elasticity, as will be described in more detail later. This document sets forth an example of a free end 41C, 42C having an oblique edge, however, it goes without saying that the free ends 41C, 42C could just as easily comprise straight edges.

The guide member 4 according to this second embodiment advantageously allows the heater duct R to be guided and supported when the latter is mounted on the fluid circuit C, while at the same time pressing it against the interconnecting fitting 3, so as to increase heat transfers to the interconnecting fitting 3. In this example, the heater duct R has a rectangular shape, as previously described. Also, the shape of the guide member 4 and especially of the hollow housing Q, formed by the two L-shaped guide lugs 41, 42, allows for optimal holding of the heater duct R by positive fit.

Figure 7A:
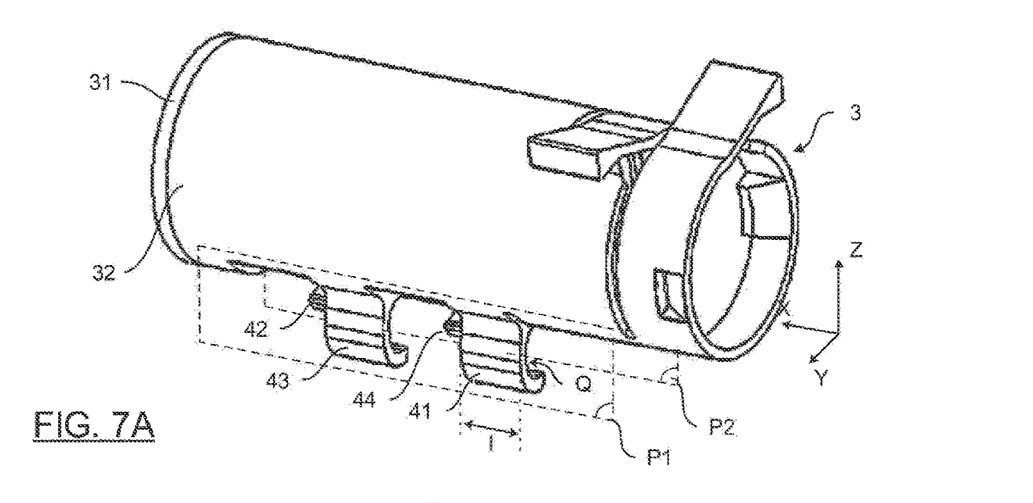
FIG. 7A and FIG. 7B are schematic representations of an interconnecting fitting according to a third embodiment of the invention.
Figure 7B:
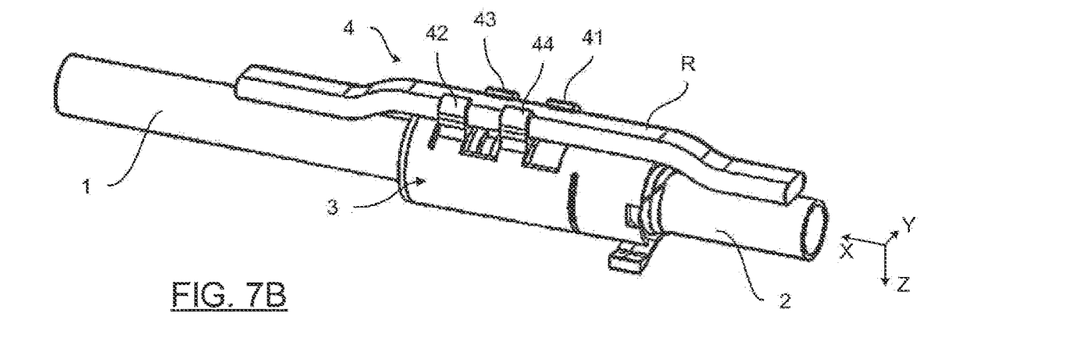

In a third embodiment of the invention, represented in FIGS. 7A and 7B, the guide member 4 comprises four guide lugs 41, 42, 43, 44 each having an L-shape and extending similarly to the two guide lugs 41, 42 described in the preceding embodiment, that is, in two planes P1, P2 parallel to the plane (X, Z). In other words, two guide lugs 41, 43 extend in a first plane P1 and two guide lugs 42, 44 extend in a second plane P2, so as to distribute the guide lugs 41, 42, 43, 44 on either side of the heater duct R when the latter is in the mounted position. Preferably, the four guide lugs 41, 42, 43, 44 are positioned longitudinally alternately in the first plane P1 and in the second plane P2, so as to ensure an effective hold on either side of the heater duct R. In other words, the guide lugs 41, 42, 43, 44 are arranged alternately to the right and left of the heater duct R, as represented in FIG. 7B.

In this example, as represented in FIG. 7A, each guide lug 41, 42, 43, 44 has a length l extending along the axis X of between 5 and 15 mm, preferably 10 mm. Also, the interconnecting fitting 3 set forth in this embodiment is lighter, which is a significant advantage considering the number of interconnecting fittings 3 required in a complete fluid circuit C of an aircraft and considering the mass constraints known in the aeronautical field.

The four guide lugs 41, 42, 43, 44 are thus distributed in order to support the heater duct R in an efficient and balanced manner, while limiting the mass of the interconnecting fitting 3.

Figure 8A:
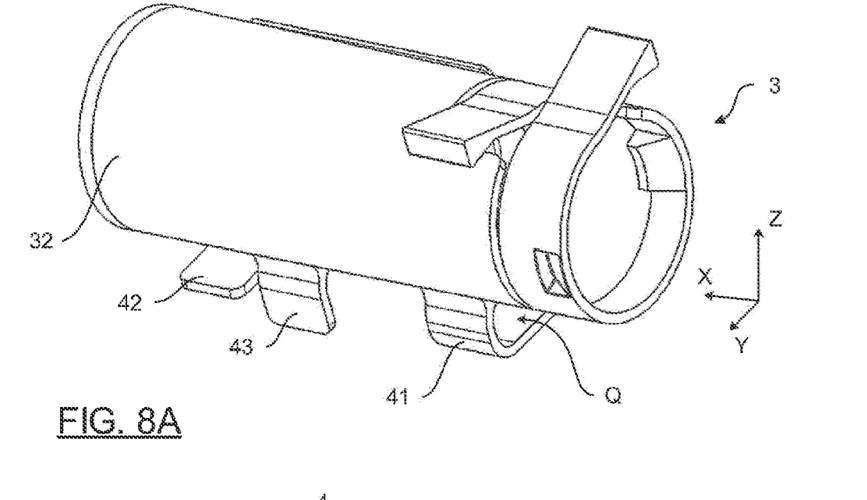
FIG. 8A and the FIG. 8B are schematic representations of an interconnecting fitting according to a fourth embodiment of the invention.
Figure 8B:
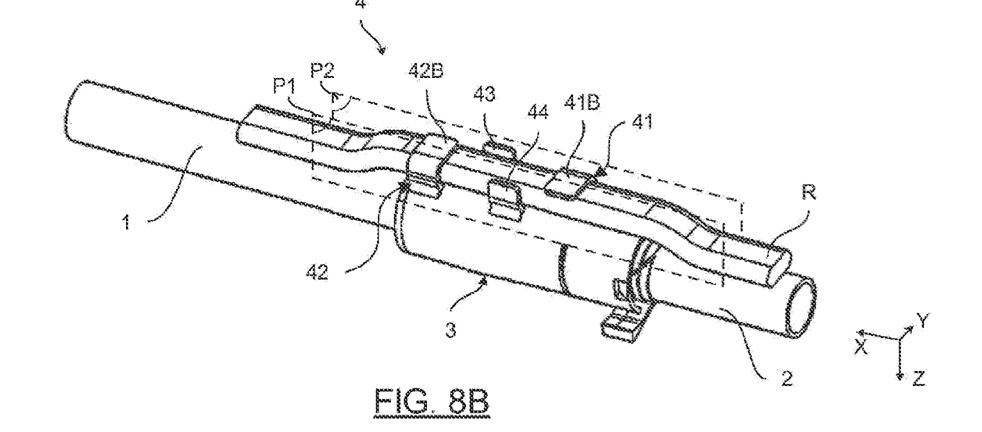

According to a fourth embodiment of the invention, represented in FIGS. 8A and 8B, the guide member 4 comprises four guide lugs 41, 42, 43, 44 extending alternately to the right and left of the heater duct R, similarly to the previously described embodiment. In other words, the four guide lugs 41, 42, 43, 44 extend longitudinally alternately to the right and left of the heater duct R, so as to ensure an effective hold when the latter is in the mounted position. In this example, two guide lugs 41, 42 are L-shaped and perform a function of guiding and supporting the heater duct R, also allowing the heater duct R to be pressed against the interconnecting fitting 3, and two guide lugs 43, 44 comprise a single side wall and perform only a function of guiding the heater duct R.

The two L-shaped guide lugs 41, 42 each extend in a distinct plane P1, P2 and comprise a bottom wall 41B, 42B extending substantially along the transverse axis Y over the entire width of the heater duct R. In other words, in this exemplary embodiment, the bottom walls 41B, 42B have a length extending transversely to the heater duct R, that is along the axis Y, larger than the length of the bottom walls 41B, 42B shown in the third embodiment, so as to support the entire width of the heater duct R. Also, when in its mounted position, the heater duct R is held securely in place. In this example, the bottom walls 41B, 42B have a length of between 10 and 15 mm.

The two guide lugs 43, 44 comprising a single side wall are positioned in this example longitudinally between the two L-shaped guide lugs 41, 42 and allow the heater duct R to be guided along the interconnecting fitting 3.

Also, the interconnecting fitting 3 shown in this embodiment is light and allows for effective guiding, support and pressing of the heater duct R.

Advantageously, the interconnecting fitting 3 according to the invention allows two pipes 1, 2 of the fluid circuit C to be connected while guiding the heater duct R when the latter is mounted. The guide member 4 integrated in the interconnecting fitting 3 furthermore allows for a simple and quick installation of the heater duct R without the use of additional parts. The guide member 4 in which the guide lugs 41, 42 comprise a bottom wall 41B, 42B further advantageously allows the heater duct R to be supported and held in place without adding any additional parts.

Figure 9A:
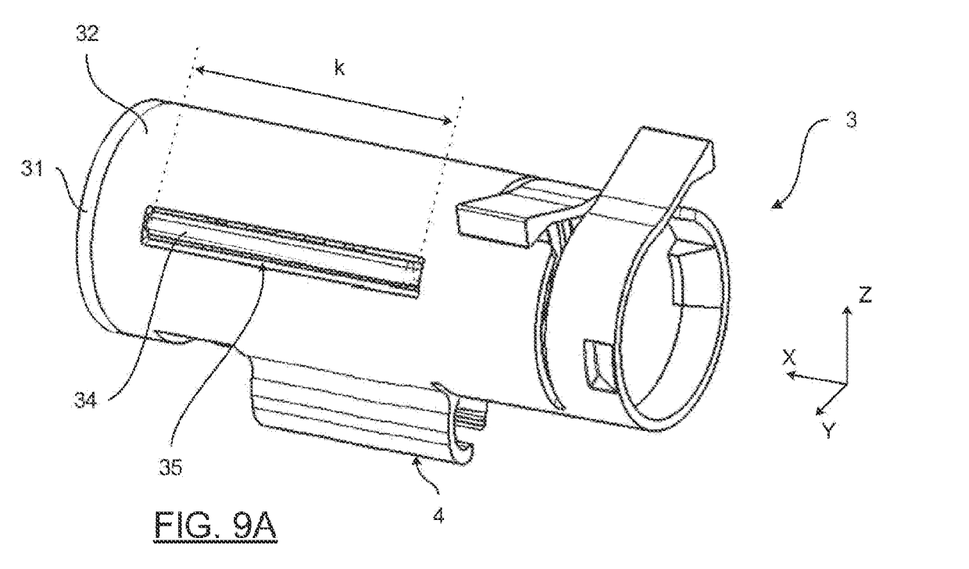
FIG. 9A and FIG. 9B are schematic representations of an interconnecting fitting comprising a positioning element according to one embodiment of the invention.
Figure 9B:
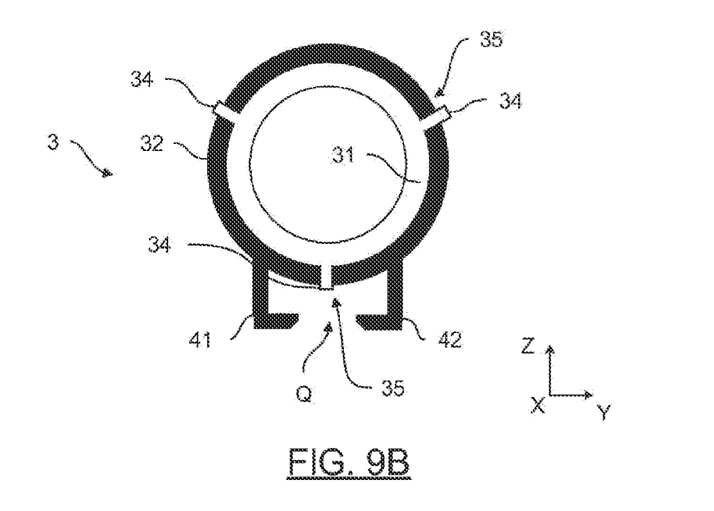

According to one embodiment of the invention, with reference to FIGS. 9A and 9B, in order to facilitate heat transfer from the heater duct R to the interconnecting fitting 3, the sealing member 31 comprises at least one positioning element 34 extending radially protruding from the radial outer surface of the sealing member 31. Such a positioning element 34 secures the sealing member 31 and the interconnecting sleeve 32 when the interconnecting fitting 3 is moved along the axis X.

In this embodiment, as illustrated in FIG. 9B, the sealing member 31 comprises several angularly distributed positioning elements 34. Preferably, each positioning element 34 extends longitudinally along the axis X, as illustrated in FIG. 9A.

In particular, in this example, the sealing member 31 comprises three positioning elements 34 extending in parallel directions that are further parallel to the longitudinal axis X of the interconnecting fitting 3 and are distributed circumferentially on the radial outer surface of the sealing member 31 equidistant from each other. Each positioning element 34 is made from the material of the sealing member 31, so as to limit the interconnection stresses between several independent parts. In this example, each positioning element 34 extends longitudinally over a length k between 23 and 33 mm.

In this preferred embodiment of the invention, still with reference to FIGS. 9A and 9B, the interconnecting sleeve 32 comprises at least one positioning aperture 35 passing through the thickness of the interconnecting sleeve 32. Such a positioning aperture 35 is configured to cooperate with the positioning element 34 of the sealing member 31.

In this embodiment, the interconnecting sleeve 32 comprises several angularly distributed positioning apertures 35. Preferably, each positioning aperture 35 extends longitudinally along the axis X.

In particular, in this example, the interconnecting sleeve 32 comprises three positioning apertures 35 extending in parallel directions that are further parallel to the longitudinal axis X of the interconnecting fitting 3 and are distributed circumferentially on the interconnecting sleeve 32 equidistant from each other. Each positioning aperture 35 extends longitudinally along the axis X over a length of between 23 and 33 mm, so as to allow their cooperation with the positioning elements 34.

Indeed, still with reference to FIG. 9A, the positioning elements 34 of the sealing member 31 are configured to be inserted into the positioning apertures 35 provided in the interconnecting sleeve 32, so as to secure the two parts and thus hold the interconnecting sleeve 32 in position on the sealing member 31 in the event of translation of the interconnecting sleeve 32 along the axis X or of rotation about said axis X.

In this example, at least one positioning element 34 extends into the hollow housing Q and is configured to be put into contact with the heater duct R when the latter is mounted. Such a configuration advantageously allows direct contact of the heater duct R with the sealing member 31. Also, the positioning element 34 allows direct heating of the sealing member 31 and thus the inside of the interconnecting fitting 3, without requiring prior heating of the interconnecting sleeve 32, which is made of thermoplastic material. The heating of the interconnecting fitting 3 is then advantageously faster and more efficient.

In an example of positioning represented in FIG. 9B, the interconnecting sleeve 32 comprises a lower end facing downward with reference to the reference frame (X, Y, Z). Preferably, one of the positioning apertures 35 extends substantially at the lower end of the interconnecting sleeve 32 so as to allow a positioning element 34 to pass downwardly protruding from the radial outer surface of the interconnecting sleeve 32 into the hollow housing Q.

Such a positioning allows the direct contact of the sealing member 31, which is itself in direct contact with the fluid, with the heater duct R, allowing the heat coming from the heater duct R to be diffused, allowing the risks of icing in the interconnecting fitting 3 to be limited. In other words, in such an embodiment of the invention, the interconnecting fitting 3 advantageously makes it possible to increase the thermal exchange between the heater duct R and the interconnecting fitting 3, compared to the embodiment of prior art in which the interconnecting fitting 3 was not in direct contact with the heater duct R.

The interconnecting fitting 3 according to the invention makes it possible to fluidly interconnect the two pipes 1, 2 and to seal the interconnection, while optimizing the heat transfers from a heater duct R. The guide member 4 which is formed on the interconnecting sleeve 32 advantageously allows, because of its integration with the interconnecting fitting 3, the heater duct R to be guided while pressing it against the interconnecting fitting 3 in order to avoid icing thereof. Furthermore, the interconnecting fitting 3 according to the invention comprises a limited number of elements, which decreases its cost. Moreover, advantageously, each element can be made at low cost, in particular, by plastic injection, which especially reduces its mass.

A method for installing an interconnecting fitting 3 and a heater duct R on the fluid circuit C according to an embodiment of the invention by means of an interconnecting fitting 3 according to the first embodiment previously described, will now be set forth. In such a method, the interconnecting fitting 3 allows the connection between a first pipe 1 and a second pipe 2, mounted facing each other. In this example, the pipes 1, 2 have been previously secured to an aircraft structure and are not movable relative to each other. In this example, the interconnecting fitting 3 is pre-mounted on the first pipe 1 as previously described.

Figure 10:
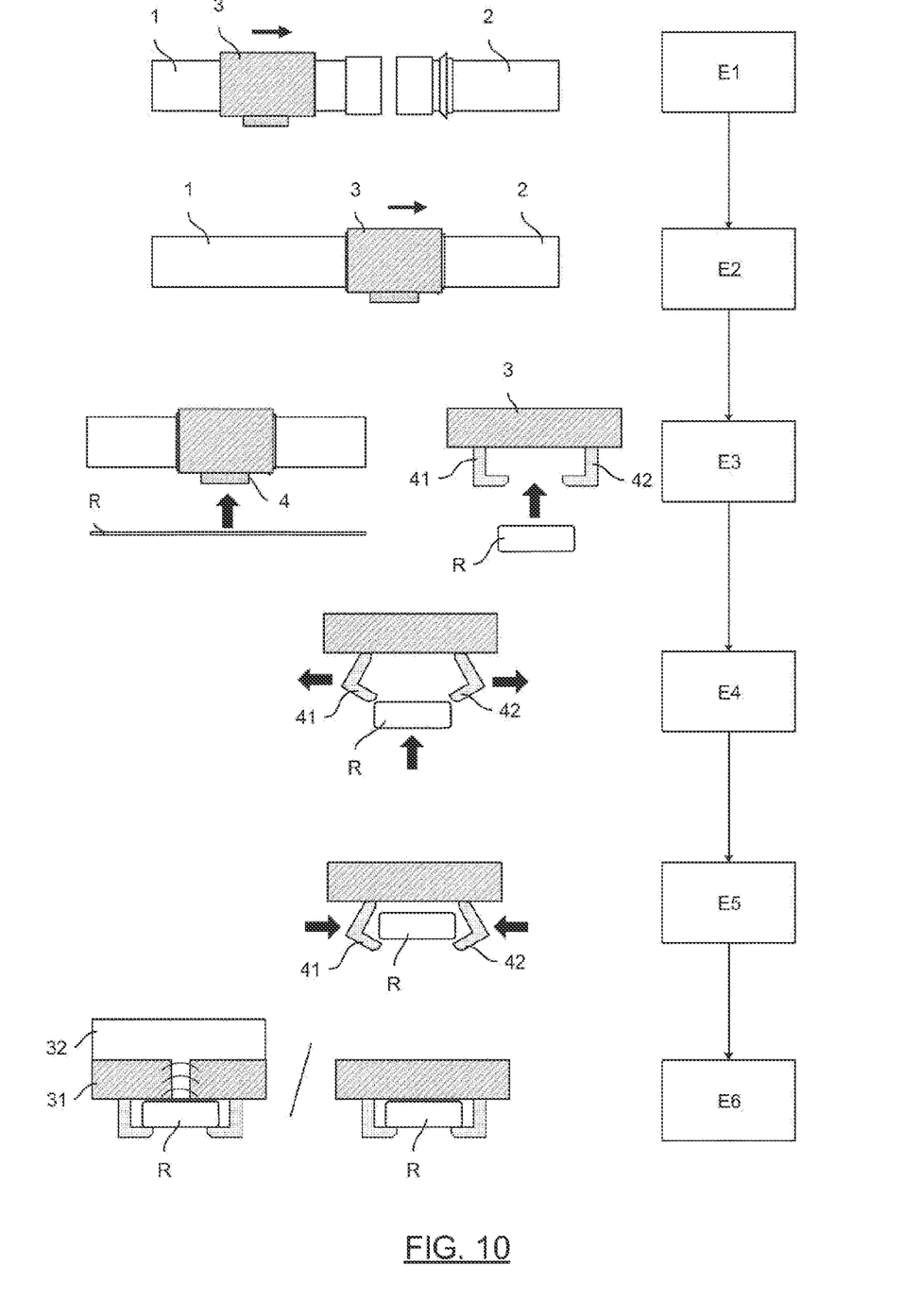
FIG. 10 is a schematic representation of steps of a method for placing an interconnecting fitting and a heater duct on a fluid circuit according to an embodiment of the invention.

With reference to FIG. 10, the method comprises a first step of positioning E1, by an operator, the interconnecting fitting 3 facing the two connection ends 11, 21. In one embodiment, the operator slides the sealing member 31 and the interconnecting sleeve 32 of the interconnecting fitting 3 along the first pipe 1 in the direction of the second pipe 2, that is along the longitudinal axis X. In other words, the interconnecting fitting 3 is brought close to the second pipe 2 and gradually covers the first connection end 11 and then the second connection end 21, so as to cover both connection ends 11, 21, thereby covering the gap clearance J between the two pipes 1, 2, allowing a sealed connection.

The positioning of the interconnecting fitting 3 makes it possible to bring the fastening device 36 of the interconnecting sleeve 32 into contact with the locking member 33, integral with the second pipe 2. The cooperation of the fastening device 36 with the locking member 33 thus makes it possible to fasten, in a fastening step E2, the interconnecting fitting 3 at the junction between the two pipes 1, 2.

The method then comprises a step E3 of positioning a heater duct R facing the guide member 4 of the interconnecting fitting 3. The operator then pushes the heater duct R so as to insert it in a step E5 into the hollow housing Q.

The heater duct R is then held in place in the hollow housing Q. For this purpose, the operator applies, in a step E6, a strip of adhesive tape S to the pipes 1, 2, which are thus intimately interconnected to the heater duct R.

When in use, the heater duct R thus mounted in the guide member 4 is pressed against the interconnecting fitting 3, which allows for improved heat transfer at the interconnecting fitting 3. Furthermore, such a method advantageously allows for simple and quick positioning of the interconnecting fitting 3 and the heater duct R, without requiring additional tooling or add-on parts.

In the case of a guide member 4 comprising two L-shaped guide lugs 41, 42, during the step E3 of positioning the heater duct R facing the guide member 4, the operator pushes the heater duct R so as to position it against the oblique edges of the guide lugs 41, 42. In the case of straight edges, it goes without saying that the operator could also open each guide lug 41, 42 manually or force the heater duct R into the hollow housing Q.

In a moving apart step E4, the two guide lugs 41, 42 are then moved apart from each other so as to provide a passage aperture for access to the hollow housing Q.

In the step of inserting E5 the heater duct R into the hollow housing Q, the two guide lugs 41, 42 return to their initial position due to their elasticity, so as to place the bottom walls 41B, 42B and the side walls 41A, 42A around the heater duct R. The heater duct R is then retained by the guide lugs 41, 42 that support it.

Each step of the method may be repeated for each junction between two pipes in a complete fluid circuit of an aircraft, comprising as such a plurality of pipes placed end-to-end and initially secured to the aircraft structure.

The invention claimed is:

1. A fluid circuit comprising at least a first pipe, a second pipe and an interconnecting fitting, each pipe comprising a connection end and extending along an axis X, the interconnecting fitting, movably mounted between said two pipes, being configured to mechanically interconnect the two connection ends, the interconnecting fitting comprising an interconnecting sleeve and a guide member formed on an outer surface of the interconnecting sleeve, the guide member, defining a hollow housing, being configured to cooperate with a heater duct so as to guide it between the two pipes, the heater duct being configured to transmit heat to the pipes and to the interconnecting fitting in order to avoid icing thereof.

2. The fluid circuit according to claim 1, wherein the guide member of the interconnecting fitting is made of the material of the interconnecting sleeve.

3. The fluid circuit according to claim 1, wherein the interconnecting fitting comprises a sealing member, extending between the connection ends of the pipes, the sealing member being positioned internally of said interconnecting sleeve, said sealing member comprises a positioning element extending protruding from the interconnecting sleeve into the hollow housing of the guide member, so as to be in direct contact with the heater duct.

4. The fluid circuit according to claim 1, wherein the guide member of the interconnecting fitting comprises at least a first guide lug and a second guide lug.

5. The fluid circuit according to claim 4, wherein at least the first guide lug is configured to extend laterally from the heater duct.

6. The fluid circuit according to claim 4, wherein the second guide lug is mounted facing the first guide lug, so as to form the hollow housing between the first guide lug and the second guide lug.

7. The fluid circuit according to claim 4, wherein at least the first guide lug is L-shaped.

8. The fluid circuit according to claim 4, wherein the first guide lug and the second guide lug are configured to elastically move apart from each other, so as to allow insertion of the heater duct.

9. An assembly of the fluid circuit according to claim 1 and a heater duct, mounted in said hollow housing of the guide member of the interconnecting fitting.

10. A method for placing a heater duct in the fluid circuit according to claim 1, said method comprising:
- a step of fastening the interconnecting fitting between the connection ends of the pipes, and
- a step of inserting the heater duct into the hollow housing of the guide member, so as to allow an intimate cooperation between the interconnecting fitting and the heater duct.

* * * * *